United States Patent [19]
Schwob

[11] Patent Number: 5,881,234
[45] Date of Patent: Mar. 9, 1999

[54] METHOD AND SYSTEM TO PROVIDE INTERNET ACCESS TO USERS VIA NON-HOME SERVICE PROVIDERS

[76] Inventor: Pierre R. Schwob, Apt. 7C, Tower 1, Euston Court, 6 Park Road, Hong Kong, Hong Kong

[21] Appl. No.: 638,360

[22] Filed: Apr. 26, 1996

[51] Int. Cl.$^6$ .............................. G06F 13/00; H04L 9/32
[52] U.S. Cl. .............................. 395/200.49; 395/187.01; 395/200.33
[58] Field of Search ......................... 395/200.33, 200.49, 395/187.01, 200.47, 200.48

[56] References Cited

U.S. PATENT DOCUMENTS

| | | | |
|---|---|---|---|
| 5,483,596 | 1/1996 | Rosenow et al. | 380/25 |
| 5,544,320 | 8/1996 | Konrad | 395/200.33 |
| 5,610,910 | 3/1997 | Focsaneanu et al. | 370/351 |
| 5,613,012 | 3/1997 | Hoffman et al. | 382/115 |
| 5,671,354 | 9/1997 | Ito et al. | 395/187.01 |

OTHER PUBLICATIONS

Magill, "Intelligent Networks; Computer aided analysis for SLP Specification," IEE Colloq., 1992 pp. 7/1–4.
M. Dillon, Big–Linux Article entitled "Re:Radius", Jul., 1995.

*Primary Examiner*—Alyssa H. Bowler
*Assistant Examiner*—Walter D. Davis, Jr.
*Attorney, Agent, or Firm*—Fitzpatrick Cella Harper & Scinto

[57] ABSTRACT

A system capable of granting Internet access to users when direct connection to their usual home Internet Service Providers (ISPs) is impossible, impractical or prohibitively expensive. The system offers users a unified method of login to other independent ISPs to provide easy and inexpensive access to the Internet and its various services. The system validates user logins, generates billing data, provides usage time and monitors communication links. The system also isolates the shells of the servers of the ISPs from the user until such time as the user has been determined to be valid, thereby providing security to the ISPs against unauthorized access to their servers. The system performs these tasks while requiring only a small amount of communication bandwidth for communication monitoring and billing.

25 Claims, 1 Drawing Sheet

METHOD AND SYSTEM TO PROVIDE INTERNET ACCESS TO USERS VIA NON-HOME SERVICE PROVIDERS

BACKGROUND OF THE INVENTION

1. Field of the Invention

An increasingly large number of computer users rely on accessing the Internet, an international connection of computer networks which cooperate to form a seamless network for their collective users. The Internet offers its users several services, most notably electronic mail (email), file transfer protocol (ftp), access to the World Wide Web (WWW) and the like.

2. Related Background Art

There are several ways to access the Internet, the most prevalent of which requires the availability and use of a telephone link over a modem between the user and the user's Internet Service Provider (ISP), such as a SLIP or PPP connection over a V.32bis or V.42bis modem. SLIP and PPP connections are also appropriate for connecting a home computer, or even a small local network, to a larger local network, which in turn is connected to the Internet.

Several value-added ISPs (VAISP), such as the Microsoft Network, Compuserve, America-On-Line, and the like, offer their users local access from a large number of cities in various countries. Thus, a user who subscribes to one of these VAISPs and is in a foreign or non-home city, for example, on business or vacation, may be able to connect to the Internet through the VAISP, without having to subscribe to a local ISP.

This is not the case, however, for users who have accounts with Independent Internet Service Providers (IISPs). In this case, users who travel away from their home cities and IISPs to other cities must either (1) subscribe to a local ISP at their destination, or (2) must access their home ISPs via a long distance telephone link. The first option is inconvenient and may require expensive service installation, and is likely to be impractical for short-term visits. The second option, although more convenient than the first option, can be expensive because of the high phone line charges, and the long distance phone connection is likely to be unreliable.

SUMMARY OF THE INVENTION

The advantages provided by access to the Internet can be enhanced considerably if such access is not made impossible, difficult or expensive during one's travels, even if one does not subscribe, or desire to subscribe, to the services of a VAISP.

Therefore it is an object of this invention to provide user access to the Internet via non-home ISPs without the user having to subscribe to a VAISP or a large number of ISPs.

It is another object of this invention to provide a unified user access method to participating ISPs.

It is another object of this invention to isolate the ISP server shell from the user until such time as the server has validated the user.

It is another object of this invention to provide such benefits to the users without the requirement of special client software.

It is another object of this invention to provide a billing and communication monitoring system which is practical for both the user and the participating independent ISPs, while using a minimum of communication bandwidth for communication monitoring and billing tasks.

In one aspect of the present invention, there is provided a method for connecting a user to the Internet via a non-home ISP. First, a phone connection is established between the user and a server of the non-home ISP and then the user sends first login information to the server over the phone connection. A Remote Access Control (RAC) task is launched by the server exclusively if the first login information is valid. A request for second login information is then sent over the phone connection from the server to the user by the RAC task, and in response, the user sends second login information back to the server. The RAC task then causes the ISP to send a validation request, including the second login information, to a Coordinator communicatively connected to the ISP. The Coordinator determines whether or not the second login data is valid and sends to the ISP a validation acknowledgement indicating whether the login information is valid. If valid, the RAC task grants the user access to the Internet via the ISP; otherwise, the phone connection between the ISP's server and the user is terminated.

In another aspect of the present invention, a system is provided for granting a user access to the Internet. The system includes a plurality of ISPs, each ISP being capable of a phone connection to the user and having a server for (1) receiving first login information from the user over the phone connection, (2) launching an RAC task exclusively if the first login information is valid, (3) sending over the phone connection to the user a request by the RAC task for a second login information, (4) receiving over the phone connection from the user the second login information and (5) sending a validation request including the second login information. This system also includes a Coordinator, capable of being communicatively connected to each ISP, for (1) receiving the validation request from the server sending the validation request, (2) determining whether the second login information is valid and (3) sending to the sending server a validation acknowledgement indicating whether the second login information is valid. If the validation acknowledgement indicates the second login information is valid, the RAC task of the sending server grants the user access to the Internet via the corresponding ISP; otherwise, the sending server terminates the phone connection to the user.

In the present invention, there is no need for a user to subscribe to an inconvenient and expensive local ISP at his or her non-home destination. There is also no need for the user to access his or her home ISP via a long distance telephone link; the phone connection to the non-home ISP is local, and thus the high expense and unreliability of long-distance phone service are avoided.

BRIEF DESCRIPTION OF THE DRAWING

The invention itself is set forth in the claims appended hereto and forming part of this specification, while an understanding of embodiments therefor may be had by reference to the detailed description taken in conjunction with the drawing in which:

DETAILED DESCRIPTION OF THE PREFERRED EMBODIMENTS

First Embodiment

Figure 1:
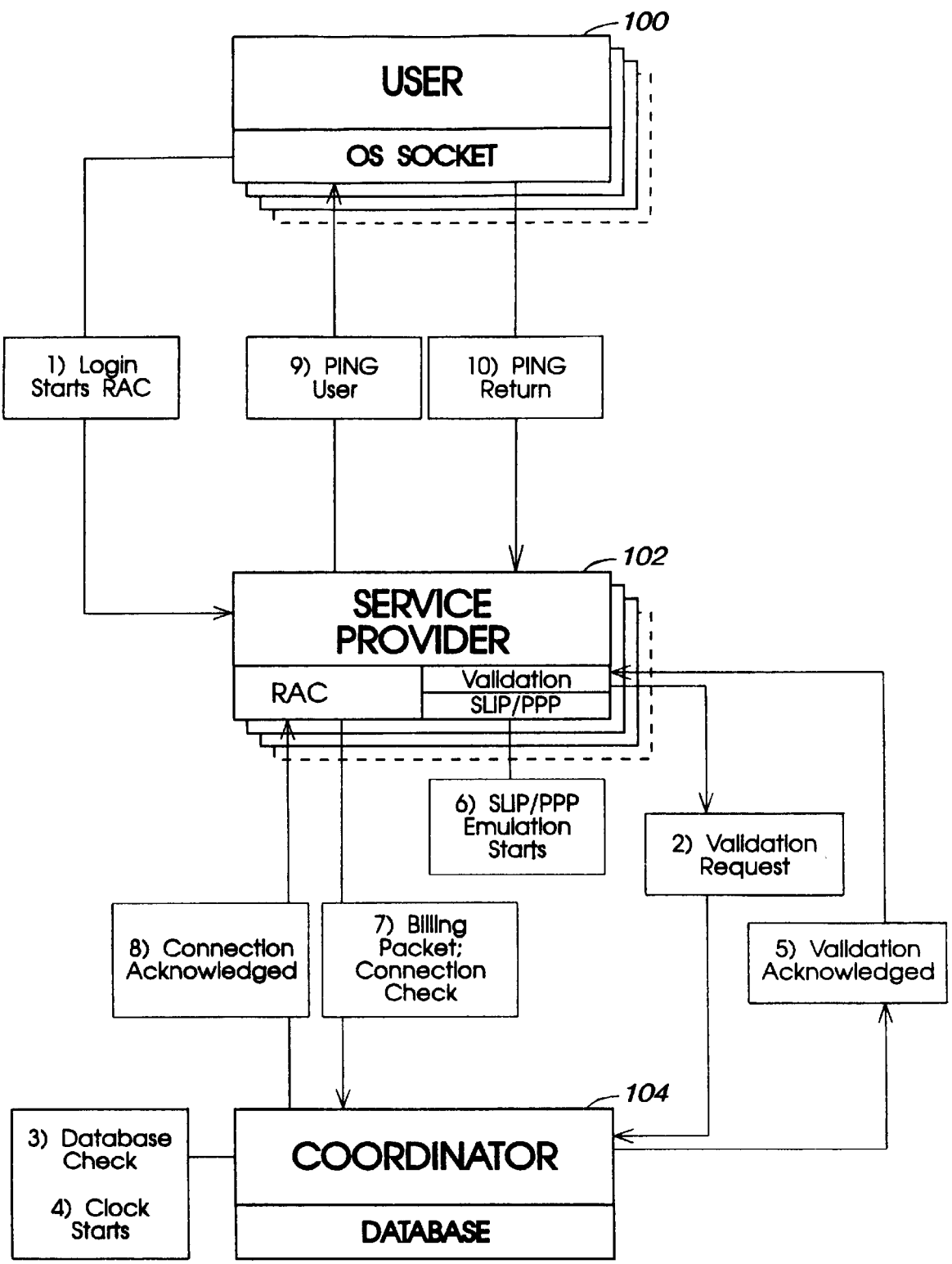
FIG. 1 is a block diagram illustrating the parties using the invention, the relationship between the parties, and the operations carried out in accordance with the invention.

In a first embodiment of the present invention, referring to FIG. 1, the parties using the present invention may include one of a plurality of Users 100, one of a plurality of Independent Internet Service Providers (IISPs) 102, and a Coordinator 104. Various operational steps (1) through (10) are also shown, whose order of operation and functionality are described in detail below.

System Initialization

Assuming the Coordinator 104 and the independent ISPs 102 have agreed to work together to provide Internet service access to non-home users, the ISPs install Remote Access Controller (RAC) software on their servers. The RAC software can only start operating, i.e., launch, upon a user logging in with both a RAC login name and a RAC password. The RAC login name and password are agreed upon by all of the participating ISPs 102 and the Coordinator 104. The RAC software is installed by ISPs 102 in such manner that its launch requires no root privilege. However, the entry of the RAC login name and password cannot launch any other task, besides the RAC, in any of the ISPs' servers.

Each User 100 obtains from Coordinator 104 the RAC login name and password and a unique user login name and password, together with a list of all participating ISPs 102 and their respective access numbers. Alternatively, the Coordinator 104 can simply provide each of the Users 100 with a login script to perform automatically the double login described below.

Connection to the Internet

User 100 initiates the connection to the Internet sequence by calling over a telephone line through a modem a server of one of the independent ISPs 102. At the login prompt, User 100 sends over the phone line to the server of the non-home ISP the RAC login name and password, which corresponds to a special RAC account. If the RAC login name and password are valid, i.e., match the corresponding RAC login name and password stored in the non-home ISP's server, the RAC task, and only that task, is launched by the non-home ISP's server (Step 1 of FIG. 1). This serves to isolate the ISP's server shell from the user until such time as the server has validated the user. This provides the ISP with greater security against unauthorized access to their servers.

The RAC task then causes to be sent over the phone connection to the User 100 a request to login with his or her unique user login name and password. User 100 then logs in with his or her unique user login name and password, and this information is sent over the phone connection to the server and the RAC task. As is readily apparent, no special client software is required to login. An optional login script; a standard Winsock stack (Trumpet, Win95, MacTCP/ interSLIP, Warp, etc.); and the user's normal list of clients may be used to simplify user login.

The RAC task then causes to be sent a Validation Request to Coordinator 104 with the user's unique login name and password (Step 2 of FIG. 1). The Validation Request may be encrypted for security purposes or may be unencrypted. The Coordinator 104 is communicatively connected to each participating ISP 102, such as by a hardwired link, a phone link, a satellite link, or the like. The Coordinator 104 determines whether User 100's unique name and password are valid, i.e., by matching both the unique user login name and password to one of a plurality of pairs of user login names and corresponding passwords stored in its user database (Step 3 of FIG. 1).

If the Coordinator 104 determines that both User 100's login name and password are valid, the Coordinator 104 starts a timer corresponding to the start of User 100's usage of the system (Step 4 of FIG. 1); if invalid, no timer is started. In either case, the Coordinator 104 sends a Validation Acknowledgment message, either encrypted or in clear, to the RAC task of the server of the ISP 102 to which User 100 is connected (Step 5 of FIG. 1).

If the Validation Acknowledgment indicates that User 100's login is invalid (User 100's login name or password or both did not match any of those in the database of Coordinator 104), the RAC task causes the server to terminate the phone connection with User 100. Of course, the RAC task may be programmed to repeat the request to the user for the user's unique login name and password for a certain number of additional times, for example, two more times, if the user login information is invalid the first time, and repeat the validation of the subsequent login information with Coordinator 104 for each request, before the user is finally disconnected. In addition, the server may terminate the phone connection with the user if it does not receive an expected validation acknowledgment within a predetermined period of time.

If the Validation Acknowledgment indicates, however, that User 100's login is valid, the RAC task causes the server of the ISP to grant User 100 access to the Internet. The server of the ISP 102 starts its own timer for User 100 and grants User 100 communication access to the Internet, for example through a SLIP or PPP emulation (Step 6 of FIG. 1). Only now may User 100 be permitted access to the shell of the server of ISP 102.

Billing and Communication Monitoring

At regular intervals, for example, every 30 seconds, the RAC task of ISP 102 causes to be sent to the Coordinator 104 a Billing Information Packet (BIP) (Step 7 of FIG. 1). The BIP may (1) provide billing information, including Internet connection time from the ISP timer, to the Coordinator 104, (2) inform the Coordinator that User 100 is still connected to the Internet and (3) confirm the connection status between the Coordinator 104 and ISP 102. The Coordinator 104 acknowledges the receipt of the BIP with a Billing Information Acknowledged (BIA) message (Step 8 of FIG. 1), which also acknowledges that the Coordinator 104 and ISP 102 are still connected.

At regular intervals, for example, every 30 seconds, the RAC task of ISP 102 also "pings" User 100 by causing ISP 102 to send to User 100 Connection Verification Requests (CVRs) (Step 9 of FIG. 1). The server of ISP 102 then waits for a ping return, or Connection Verification Acknowledgement (CVA) (Step 10 of FIG. 1). This "pinging" is to verify that User 100 is still connected to the server.

If either the BIA or the CVA are not received, connection between the User 100 and the ISP 102 can be terminated. This helps insure that very little connection time remains unaccounted for. Further, the respective timers in the ISP 102 and the Coordinator 104 also help insure that very little connection time remains unaccounted for, since the ISP 102 and the Coordinator 104 share billing data as follows. When the user disconnects or is disconnected from the Internet, the timer in the Coordinator 104 provides the non-home ISP a first total connection time for the user which is used to generate billing data for the user; the timer in the non-home ISP provides a second total connection time to generate billing data for the Coordinator 104. Moreover, since both the ISP 102 and the Coordinator 104 share the billing data, invoicing between the Coordinator 104 and User 100 is made simpler.

The exchange of BIPs and BIAs between the ISP 102 and the Coordinator 104, and the exchange of CVRs and CVAs between the ISP 102 and the User 100, provide for billing and communication monitoring that is practical for both the user and the participating ISPs. Moreover, since the BIPs, BIAs, CVRs and CVAs use relatively little information, and are sent on a periodic basis, the system requires only a small amount of communication bandwidth for communication monitoring and billing.

Second Embodiment

In a second embodiment of the present invention, only one login is used by User 100 to login to the server of independent ISP 102. In this embodiment, User 100's login name and password, if valid, would cause the server of the ISP 102 to launch only the RAC task. Accordingly, the user's login name and password, must possess a unique property, or belong to a unique class of logins, from which the ISP server can deduce that only the RAC task, and no other task, is to be launched. That same login name and password are then sent to the Coordinator 104 for validation as in the first embodiment.

Of course, it will be appreciated that the invention may take forms other than those specifically described, and the scope of the invention is to be determined solely by the following claims.

What is claimed is:

1. A method for connecting a user to the Internet via a non-home Internet Service Provider (ISP), said method comprising the steps of:

establishing a phone connection between the user and a server of the non-home ISP;

sending over the phone connection first login information from the user to the server of the non-home ISP;

launching, by the non-home ISP's server, a Remote Access Control (RAC) task exclusively if the first login information is valid;

sending over the phone connection from the server to the user a request by the RAC task for second login information;

sending over the phone connection from the user to the server the second login information so that the RAC task causes the non-home ISP to send a validation request including the second login information to a Coordinator communicatively connected to the non-home ISP;

determining by the Coordinator whether the second login data is valid and sending from the Coordinator to the non-home ISP a validation acknowledgement indicating whether the second login information is valid; and if the validation acknowledgement received by the non-home ISP indicates the second login information is valid, granting the user access by the RAC task to the Internet via the non-home ISP, otherwise, terminating the phone connection between the non-home ISP's server and the user.

2. A method according to claim 1, wherein the non-home ISP provides the user access to the Internet by SLIP emulation.

3. A method according to claim 1, wherein the first login information comprises an RAC login name and an RAC password.

4. A method according to claim 1, wherein the second login information comprises a user login name and a user password unique to the user.

5. A method according to claim 1, wherein the validation request is encrypted.

6. A method according to claim 4, wherein the Coordinator has a database comprising a plurality of pairs of user login names and corresponding user passwords, and the Coordinator determines whether the second login information is valid by matching both the unique user login name and unique user password to one of the pairs of the plurality of pairs of user login names and corresponding user passwords.

7. A method according to claim 1, further comprising the step of terminating the phone connection by the server of the non-home ISP if the non-home ISP does not receive the validation acknowledgement within a predetermined period of time.

8. A method according to claim 1, further comprising the steps of starting a first timer in the Coordinator for timing the user when said determining step determines that the second login information is valid and starting a second timer in the non-home ISP for timing the user when the user is granted access to the Internet by the non-home ISP.

9. A method according to claim 8, further comprising the steps of:

disconnecting the connection between the user and the non-home ISP;

subsequently stopping the first timer in the Coordinator to generate a first total connection time for the user; and stopping the second timer in the non-home ISP to generate a second total connection time for the user.

10. A method according to claim 9, wherein the first total connection time for the user in the Coordinator is used to generate billing data for the user and the second total connection time for the user in the non-home ISP is used to generate billing data for the Coordinator.

11. A method according to claim 8, further comprising the steps of sending a plurality of Billing Information Packets (BIP) from the non-home ISP to the Coordinator, each BIP being sent at a predetermined interval of time, and a plurality of Billing Information Acknowledgements (BIA) from the Coordinator to the non-home ISP, each BIA being sent in response to receiving each BIP.

12. A method according to claim 11, wherein the BIP comprises a connection time from the second timer of the non-home ISP for the user.

13. A method according to claim 11, further comprising the step of disconnecting the user from the non-home ISP if the BIA is not received from the Coordinator in response to any of the BIPS.

14. A method according to claim 1, further comprising the steps of sending a plurality of Connection Verification Requests (CVR) from the non-home ISP to the user, each CVR being sent at a predetermined interval of time, and sending a plurality of Connection Verification Acknowledgements (CVA) from the user to the non-home ISP, each CVA being sent in response to receiving each CVR.

15. A method according to claim 14, further comprising the step of disconnecting the user from the non-home ISP if the CVA is not received from the user in response to any of the CVRs.

16. A method according to claim 1, wherein the non-home ISP provides the user access to the Internet by PPP emulation.

17. A method according to claim 1, wherein the user uses a login script to send the first and second login information to the non-home ISP's server.

18. A method for connecting a user to the Internet via a non-home Internet Service Provider (ISP), said method comprising the steps of:

establishing a phone connection between the user and a server of the non-home ISP;

sending over the phone connection login information from the user to the server of the non-home ISP;

launching, by the non-home ISP's server, of a Remote Access Controller (RAC) task exclusively if the login information is valid, the RAC task causing the non-home ISP's server to send a validation request including the login information to a Coordinator communicatively connected to the non-home ISP;

determining by the Coordinator whether the login data is valid and sending from the Coordinator to the non-home ISP a validation acknowledgement indicating whether the login information is valid;

if the validation acknowledgement received by the non-home ISP indicates the login information is valid, granting the user access by the RAC task to the Internet via the non-home ISP, otherwise, terminating the phone connection between the non-home ISP's server and the user.

19. A method according to claim 18, the login information comprises a combined RAC/user login name and a combined RAC/user password unique for the user.

20. A system for providing a user access to the Internet, comprising:

a plurality of Internet Service Providers (ISPs), each ISP being capable of a phone connection to the user and having a server for (1) receiving first login information from the user over the phone connection, (2) launching an RAC task exclusively if the first login information is valid, (3) sending over the phone connection to the user a request by the RAC task for second login information, (4) receiving over the phone connection from the user the second login information and (5) sending a validation request including the second login information; and a Coordinator, capable of being communicatively connected to each ISP, for (1) receiving the validation request from the server sending the validation request, (2) determining whether the second login information is valid and (3) sending to the sending server a validation acknowledgement indicating whether the second login information is valid, wherein if the validation acknowledgement indicates the second login information is valid, the RAC task of the sending server grants the user access to the Internet via the corresponding ISP, and if not valid, the sending server terminates the phone connection to the user.

21. A system for providing a user access to the Internet, comprising:

a plurality of Internet Service Providers (ISPs), each ISP being capable of a phone connection to the user and having a server for (1) receiving login information from the user over the phone connection, (2) launching an RAC task exclusively if the login information is valid, (3) sending a validation request including the login information; and a Coordinator, capable of being communicatively connected to each ISP, for (1) receiving the validation request from the server sending the validation request, (2) determining whether the login information is valid and (3) sending to the sending server a validation acknowledgement indicating whether the login information is valid, wherein if the validation acknowledgement indicates the login information is valid, the RAC task of the sending server grants the user access to the Internet via the corresponding ISP, and if not valid, the sending server terminates the phone connection to the user.

22. A storage medium storing a computer readable program which when executed causes a user's computer to perform a method of connecting the user's computer to the Internet via a non-home Internet Service Provider (ISP), said method comprising the step of:

sending over a phone connection, established between the user's computer and a server of the non-home ISP, login information to the server of the non-home ISP, thereby causing the non-home ISP's server to launch a Remote Access Control (RAC) task exclusively if the login information is valid, and further causing the RAC task of the non-home ISP to send a validation request, including the login information, to a Coordinator communicatively connected to the non-home ISP, the Coordinator then determining whether the login data is valid and sending to the RAC task of the non-home ISP a validation acknowledgement confirming the validity of the login information, in turn causing the RAC task to grant the user's computer access to the Internet via the non-home ISP.

23. A storage medium storing a computer readable program which when executed causes a user's computer to perform a method of connecting the user's computer to the Internet via a non-home Internet Service Provider (ISP), said method comprising the steps of:

sending over a phone connection, established between the user's computer and a server of the non-home ISP, first login information to the server of the non-home ISP, thereby causing the non-home ISP's server to launch a Remote Access Control (RAC) task exclusively if the first login information is valid;

receiving over the phone connection from the server a request by the RAC task for second login information; and sending over the phone connection to the server the second login information, thereby causing the RAC task of the non-home ISP to send a validation request, including the second login information, to a Coordinator communicatively connected to the non-home ISP, the Coordinator then determining whether the second login data is valid and sending to the RAC task of the non-home ISP a validation acknowledgement confirming the validity of the second login information, in turn causing the RAC task to grant the user's computer access to the Internet via the non-home ISP.

24. A storage medium storing a computer readable program which when executed causes a non-home Internet Service Provider (ISP)'s server to perform a method of connecting a user's computer to the Internet via the non-home ISP, said method comprising the steps of:

receiving over a phone connection, established between the user's computer and the server of the non-home ISP, login information from the user's computer;

launching a Remote Access Control (RAC) task exclusively if the login information is valid;

causing the RAC task to send a validation request, including the login information, to a Coordinator communicatively connected to the non-home ISP, the Coordinator then determining whether the login data is valid;

receiving from the Coordinator a validation acknowledgement confirming the validity of the login information; and causing the RAC task to grant the user's computer access to the Internet via the non-home ISP.

25. A storage medium storing a computer readable program which when executed causes a Coordinator's computer to perform a method of validating login information used for connecting a user's computer to the Internet via a non-home Internet Service Provider (ISP), the Coordinator being communicatively connected to the non-home ISP, and the login information being sent to a server of the non-home ISP from the user's computer over a phone connection established therebetween, said method comprising the steps of:

receiving a validation request, including the login information, from a Remote Access Control (RAC) task launched by the server of the non-home ISP, the RAC task having been launched exclusively by the non-home ISP if the login information is valid;

determining whether the login data is valid in response to the validation request; and sending to the RAC task a validation acknowledgement confirming the validity of the login information, thereby causing the RAC task to grant the user's computer access to the Internet via the non-home ISP.

* * * * *